US009501766B2

(12) United States Patent
Gamble et al.

(10) Patent No.: US 9,501,766 B2
(45) Date of Patent: Nov. 22, 2016

(54) GENERATING A STORAGE DRIVE QUALIFICATION TEST PLAN

(75) Inventors: Eric T. Gamble, Raleigh, NC (US); Steve J. Livaccari, Wake Forest, NC (US); Henry Pesulima, Raleigh, NC (US); John A Poetzinger, Cary, NC (US); Timothy Landell, Fuquay Varina, NC (US); Eric A. Stegner, Durham, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1178 days.

(21) Appl. No.: 13/537,435

(22) Filed: Jun. 29, 2012

(65) Prior Publication Data

US 2014/0005972 A1    Jan. 2, 2014

(51) Int. Cl.
*G06F 11/00* (2006.01)
*G06Q 10/00* (2012.01)
*G06F 11/22* (2006.01)

(52) U.S. Cl.
CPC .......... *G06Q 10/20* (2013.01); *G06F 11/2221* (2013.01)

(58) Field of Classification Search
CPC .... G01F 11/22; G01F 11/2221; G06Q 10/20
See application file for complete search history.

(56) References Cited

U.S. PATENT DOCUMENTS

| 5,848,403 A | 12/1998 | Gabriner et al. |
|---|---|---|
| 6,397,359 B1 | 5/2002 | Chandra et al. |
| 6,651,192 B1 | 11/2003 | Viglione et al. |
| 7,188,226 B2 | 3/2007 | De Brebisson et al. |
| 7,386,763 B2 | 6/2008 | Sathe |
| 7,441,197 B2 | 10/2008 | Tschiegg et al. |
| 7,676,700 B2 | 3/2010 | Fan et al. |
| 7,826,915 B1 | 11/2010 | Logsdon et al. |
| 7,890,796 B2 | 2/2011 | Pawar et al. |
| 2005/0055227 A1 | 3/2005 | Chien |
| 2009/0093903 A1 | 4/2009 | Clemens et al. |

FOREIGN PATENT DOCUMENTS

CN          102222517          10/2011

*Primary Examiner* — Mischita Henson
(74) *Attorney, Agent, or Firm* — Kunzler Law Group; Damion Josephs

(57) ABSTRACT

A method for generating a storage drive qualification test plan includes receiving input values for a plurality of variables for a qualification test of a storage drive model. Each variable has a drive requirement weight and/or a testing schedule weight. The method includes determining a plurality of weighted drive requirement values by adjusting each input value having a corresponding drive requirement weight by the corresponding drive requirement weight and determining a plurality of weighted testing schedule values by adjusting each input value having a corresponding testing schedule weight by the corresponding testing schedule weight. The method also includes determining a storage drive requirement by increasing or decreasing a baseline storage drive requirement according to the weighted drive requirement values. The method includes determining a testing schedule by increasing or decreasing a baseline testing schedule according to the weighted testing schedule values.

20 Claims, 8 Drawing Sheets

| Variables | Possible Values | Drive Req. Weight | Testing Schedule Weight |
|---|---|---|---|
| Async. or Sync. | Async. or Sync. | Asynch = 1, Sych. = 2 | Asynch = .85, Sych. = 1.25 |
| Part No. Variation | 1-5 | 1 = 1, 2 = .75, 3 = .6, 4 = .5, 5 = .4 | 1=1, 2=1.1, 3=1.15, 4=1.175, 5=1.2 |
| Hardware Commonality | 0 -100 | 0 = .5, 50 = 1, 100 = 1.5 | 0 = .7, 50 = 1, 100 = 1.1 |
| Firmware Commonality | 0 -100 | 0 = .7, 50 = 1, 100 = 1.3 | 0 = .85, 50 = 1, 100 = 1.05 |
| Urgency | 0 -10 | 0 = .5, 50 = 1, 10 = 2 | 0 = 1.1, 50 = 1, 100 = .5 |
| New External Tech. | Yes or No | No = 1, Yes = 2 | No = 1, Yes = 1.3 |
| New Internal Tech. | Yes or No | No = 1, Yes = 1.5 | No = 1, Yes = 1.2 |
| Previous Generation | Yes or No | No = 1, Yes = .75 | No = 1, Yes = .9 |
| Supplier Experience | 0 -10 | No = 1, Yes = 1.2 | No = 1, Yes = 1.1 |
| Sample Quantity | 0 -10 | N/A | 0 = 1.2, 5 = 1, 10 = .75 |

FIG. 5A

| Variables | Values | W. Drive Values | W. Sched. Values |
|---|---|---|---|
| Async. or Sync. | Sync. | 2 | 1.2 |
| Part No. Variation | 4 | .48 | .99 |
| Hardware Commonality | 100 | 1.5 | 1.1 |
| Firmware Commonality | 100 | 1.3 | 1.05 |
| Urgency | 5 | 1 | 1 |
| New External Tech. | Yes | 2 | 1.3 |
| New Internal Tech. | Yes | 1.5 | 1.2 |
| Previous Generation | No | 1 | 1 |
| Supplier Experience | 10 | 1.2 | 1.1 |
| Sample Quantity | 5 | N/A | 1 |

FIG. 5B

| Variables | Drive Req. Weight % | Testing Sch. Weight % |
|---|---|---|
| Async. or Sync. | 15% | 14% |
| Part No. Variation | 9% | 7% |
| Hardware Commonality | 15% | 14% |
| Firmware Commonality | 9% | 7% |
| Urgency | 23% | 20% |
| New External Tech. | 15% | 10% |
| New Internal Tech. | 8% | 7% |
| Previous Generation | 4% | 3% |
| Supplier Experience | 3% | 3% |
| Sample Quantity | N/A | 15% |

FIG. 5C

| Baseline Storage Drive Req. | |
|---|---|
| ELP Drives | 200 |
| SSDV Drives | 20 |
| SIT Drives | 100 |

| Baseline Testing Schedule | |
|---|---|
| RDT | 66 |
| ELP | 56 |
| SSDV | 49 |
| SIT | 56 |

FIG. 5D

| Storage Drive Requirement | |
|---|---|
| ELP Drives | 266 |
| SSDV Drives | 27 |
| SIT Drives | 133 |
| Total Drives | 426 |

| Testing Schedule | |
|---|---|
| RDT | 66 |
| SSDV | 61 |
| ELP | 54 |
| SIT | 61 |
| Total | 148 |

FIG. 5E

GENERATING A STORAGE DRIVE QUALIFICATION TEST PLAN

FIELD

The subject matter disclosed herein relates to a storage drive qualification test and more particularly relates to generating a storage drive qualification test plan.

BACKGROUND

Description of the Related Art

Storage drive qualification testing is typically performed to certify a storage drive model as being usable in a particular computing system. For example, in order to sell a server, hard disk drives for potential use with that server are often tested to determine whether they will maintain a certain level of reliability and whether they are compatible with the server.

However, a certain amount of guesswork is often involved in determining various test parameters such as how many days a qualification test will take and how many storage drives are needed for the qualification test. Often, computing system manufacturers and storage drive suppliers attempt to work together to agree upon these test parameter or manufacturers or suppliers may rely on professionals with years of experience to determine these testing parameters. However, the test parameters often still change due to unforeseen circumstances.

BRIEF SUMMARY

A method for generating a storage drive qualification test plan is disclosed. In one embodiment, the method includes receiving input values for a plurality of variables for a qualification test of a storage drive model. The plurality of variables are associated with factors that increase or decrease testing time and a number of storage drives for testing. Each variable has a drive requirement weight and/or a testing schedule weight. The variables are independent of specifications of the storage drive model. The method includes determining a plurality of weighted drive requirement values by adjusting each input value having a corresponding drive requirement weight by the corresponding drive requirement weight and determining a plurality of weighted testing schedule values by adjusting each input value having a corresponding testing schedule weight by the corresponding testing schedule weight. The method also includes determining a storage drive requirement by increasing or decreasing a baseline storage drive requirement according to the weighted drive requirement values. The storage drive requirement specifies a number of storage drives for testing during the qualification test. The method includes determining a testing schedule by increasing or decreasing a baseline testing schedule according to the weighted testing schedule values. The testing schedule includes an estimated time requirement for the qualification test.

In a further embodiment, the baseline storage drive requirement includes an industry baseline storage drive requirement, an average storage drive requirement, or a minimum storage drive requirement and the baseline testing schedule includes an industry baseline testing schedule, an average testing schedule, or a minimum testing schedule.

In a further embodiment, the method includes adjusting the baseline storage drive requirement and the baseline testing schedule based on an actual storage requirement and an actual number of storage drives from a completed qualification test. The actual storage drive requirement includes an actual number of storage drives tested during the completed qualification test and the actual testing schedule includes an actual testing time of the completed qualification test.

In one embodiment, the method includes receiving a plurality of storage drive model attributes of the storage drive model for the qualification test. The storage drive model attributes include a drive speed, a drive size, a number of available capacity points, and/or a drive interface. In certain embodiments, the method includes determining that one or more of the storage drive model attributes match one or more storage drive model attributes from a completed qualification test. In a further embodiment, the method includes adjusting one or more drive requirement weights and one or more testing schedule weights based on an actual storage drive requirement and an actual testing schedule of the completed qualification test in response to determining that one or more of the storage drive model attributes match one or more storage drive model attributes from the completed qualification test. The actual storage drive requirement includes an actual number of storage drives tested during the completed qualification test. The actual testing schedule includes an actual testing time of the completed qualification test.

In one embodiment, determining the storage drive requirement further includes determining a number of storage drives for a plurality of qualification test phases and determining the testing schedule further includes determining an estimated time requirement for a plurality of test phases. In a further embodiment, the plurality of qualification test phases includes an Early Life Performance (ELP) test phase, a Sub System Design Verification (SSDV) test phase, and a System Integration Testing (SIT) test phase.

In one embodiment, the plurality of variables are selected from the group consisting of an asynchronous or synchronous qualification variable, a part number variation variable, a hardware commonality factor variable, a firmware commonality factor variable, an urgency factor variable, a new external feature variable, a new internal technology variable, a previous generation derivative variable, a supplier experience factor variable, and a sample quantity variable.

In one embodiment, the method further includes determining one or more sub-variables based on the input values for the plurality of variables and receiving one or more input values for the one or more sub-variables. The storage drive requirement and the testing schedule are determined in part based on the input values for the one or more sub-variables.

In some embodiments, each possible input value of a plurality of possible input values correspond to a weighted drive requirement value and/or a weighted testing schedule value. In these embodiments, determining the plurality of weighted drive requirement values and determining the plurality of weighted testing schedule values further includes correlating each input value with a corresponding weighted drive requirement value and/or a weighted testing schedule value.

In certain embodiments, determining the storage drive requirement further includes averaging the plurality of weighted drive requirement values and multiplying the average of the plurality of weighted drive requirement values by the baseline storage drive requirement. In one embodiment, determining the testing schedule further includes averaging the plurality of weighted testing schedule values and multiplying the average of the plurality of weighted testing schedule values by the baseline testing schedule. In one embodiment, the drive requirement weight for a particular variable is different than the testing schedule weight for the particular variable.

An apparatus for generating a storage drive qualification test plan is disclosed. In one embodiment, the apparatus includes a receiving module, a weighted value module, a drive requirement module, and a testing schedule module. The receiving module receives input values for a plurality of variables for a qualification test of a storage drive model. The plurality of variables are associated with factors that increase or decrease testing time and a number of storage drives for testing. Each variable has a drive requirement weight and/or a testing schedule weight, the variables independent of specifications of the storage drive model. The weighted value module determines a plurality of weighted drive requirement values by adjusting each input value having a corresponding drive requirement weight by the corresponding drive requirement weight. The weight value module determines a plurality of weighted testing schedule values by adjusting each input value having a corresponding testing schedule weight by the corresponding testing schedule weight. The drive requirement module determines a storage drive requirement by increasing or decreasing a baseline storage drive requirement according to the weighted drive requirement values. The storage drive requirement specifies a number of storage drives for testing during the qualification test. The testing schedule module determines a testing schedule by increasing or decreasing a baseline testing schedule according to the weighted testing schedule values. The testing schedule includes an estimated time requirement for the qualification test.

In a further embodiment, the apparatus includes a server executing the receiving module, the weighted value module, the drive requirement module, and the testing schedule module. The server includes a processor and a memory. In some embodiments, the apparatus includes an attribute receiving module that receives a plurality of storage drive model attributes of the storage drive model for the qualification test. The storage drive model attributes include a drive speed, a drive size, a number of capacity points, and/or a drive interface. In a further embodiment, the apparatus includes a feedback module that determines that one or more of the storage drive model attributes match one or more storage drive model attributes from a completed qualification test and adjusts one or more drive requirement weights and one or more testing schedule weights based on an actual storage drive requirement and an actual testing schedule of the completed qualification test in response to determining that one or more of the storage drive model attributes match one or more storage drive model attributes from the completed qualification test. The actual storage drive requirement includes an actual number of storage drives tested during the completed qualification test and the actual testing schedule includes an actual testing time of the completed qualification test.

A computer program product comprising a computer readable storage medium having computer readable program code embodied therewith is also disclosed. In one embodiment, the computer program product includes receiving input values for a plurality of variables for a qualification test of a storage drive model. The plurality of variables are associated with factors that increase or decrease testing time and a number of storage drives for testing. Each variable has a drive requirement weight and/or a testing schedule weight. The variables are independent of specifications of the storage drive model. The computer program product includes determining a plurality of weighted drive requirement values by adjusting each input value having a corresponding drive requirement weight by the corresponding drive requirement weight and determining a plurality of weighted testing schedule values by adjusting each input value having a corresponding testing schedule weight by the corresponding testing schedule weight. The computer program product includes determining a storage drive requirement by increasing or decreasing a baseline storage drive requirement according to the weighted drive requirement values. The storage drive requirement specifies a number of storage drives for testing during the qualification test. The computer program product includes determining a testing schedule by increasing or decreasing a baseline testing schedule according to the weighted testing schedule values. The testing schedule includes an estimated time requirement for the qualification test.

In one embodiment, the plurality of variables are selected from the group consisting of an asynchronous or synchronous qualification variable, a part number variation variable, a hardware commonality factor variable, a firmware commonality factor variable, an urgency factor variable, a new external feature variable, a new internal technology variable, a previous generation derivative variable, a supplier experience factor variable, and a sample quantity variable. In one embodiment, determining the storage drive requirement further includes determining a number of storage drives for a plurality of qualification test phases. In this embodiment, determining the testing schedule further includes determining an estimated time requirement for a plurality of test phases. In one embodiment, the plurality of qualification test phases includes an Early Life Performance (ELP) test phase, a Sub System Design Verification (SSDV) test phase, and a System Integration Testing (SIT) test phase.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 5A is a table illustrating one embodiment of variables for a qualification test and corresponding drive requirement weights and testing schedule weights in accordance with the present invention;

FIG. 5B is a table illustrating one embodiment of input values for variables for a qualification test in accordance with the present invention;

FIG. 5C is a table illustrating one embodiment of weight percentages for drive requirement weights and testing schedule weights in accordance with the present invention;

FIG. 5D is a table illustrating one embodiment of a baseline storage drive requirement and a baseline testing schedule in accordance with the present invention;

FIG. 5E is a table illustrating one embodiment of a storage drive requirement and a testing schedule in accordance with the present invention;

DETAILED DESCRIPTION OF THE INVENTION

Figure 1:
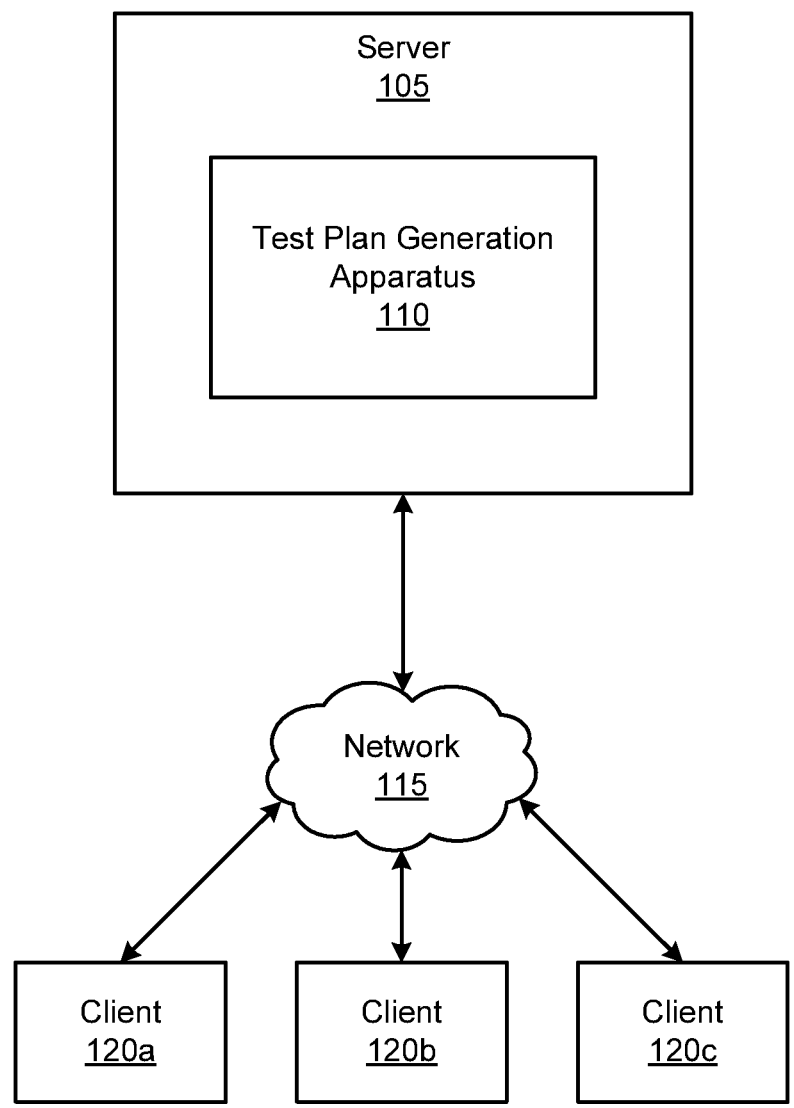
FIG. 1 is a schematic block diagram illustrating one embodiment of a system for generating a storage drive qualification test plan in accordance with the present invention.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireline, optical fiber, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. The computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

FIG. 1 is a schematic block diagram illustrating one embodiment of a system 100 for generating a storage drive qualification test plan. In the depicted embodiment, the system 100 includes a server 105 with a test plan generation apparatus 110. The test plan generation apparatus 110 generates a test plan for a storage drive qualification test. Storage drive qualification testing is performed to ensure storage drives as usable in and/or compatible with a computing system. Often, in order to produce a computing system that includes a particular storage drive model, a certain number of storage drives of that model are tested using various tests over certain periods of time.

If the storage drive model passes the qualification test, it may be qualified for and/or deemed compatible for use on that computing system. As used herein, a computing system may include a device having a processor and a memory. A computing system may store computer readable programs and other data on one or more storage drives. A computing system may include, but is not limited to, a server computer, a desktop computer, a laptop computer, a tablet computer, a mobile device, or the like. Furthermore, a storage drive may be a device that tangibly stores electronic data. A storage drive may include, but is not limited to, a Solid State Drive ("SSD"), a hard disk drive ("HDD"), an optical storage device, a holographic storage device, a micromechanical storage device, or other non-volatile data storage device.

A storage drive qualification test typically includes several qualification test phases for testing a single generation of a particular storage drive model with a particular interface, such as a Serial Attached SCSI ("SAS") or Serial ATA ("SATA") interface. A storage drive model is a classification or group of storage drives from a particular storage drive supplier and may include a single line of storage drives, a single family of storage drives, and/or storage drives that have a certain amount of common specifications. One example of a storage drive model is the Seagate Savvio 15K. A storage drive model may have multiple generations. A storage drive supplier may make improvements or modifications in a storage drive model and, instead of releasing the storage drives under a new model classification, may release the storage drives under the same storage drive model classification but under a subsequent version number. Storage drives of a later version of a storage drive model may have certain features and/or specifications that differ from storage drives of the storage drive model having an earlier version. As used herein, a storage drive supplier is a manufacturer of the storage drive model and/or a supplier of storage drives for a qualification test.

One test phase of a qualification test is a Reliability Demonstration Testing ("RDT") test phase. RDT may focus on reliability of a storage drive model and may primarily involve stress testing. An RDT may approximate how long storage drives of a particular storage drive model will last before they fail. RDT may be a unit test, meaning that it tests the storage drive itself independent of a computing system that the storage drive may be a part of. RDT is typically performed and/or controlled by the storage drive supplier.

Another qualification test phase may be an Early Life Performance ("ELP") test phase. An ELP may be a long term sustained stress test at a system level, meaning that storage drives are tested as part of a computing system (e.g. the computing system for which the storage drives are to be certified for use). Another qualification test phase may be a Sub System Design Verification ("SSDV") test phase. An SSDV may involve a unit test characterizing behavior of the drive and interactions in a computing system. Yet another qualification test is a System Integration Testing ("SIT") qualification test phase, a system level test that focuses on compatibility with a computing system.

Each qualification test phase may be performed for a specific amount of time. For example, an SSDV test may last 54 days. In addition, each qualification test phase may require a certain number of storage drives (samples) of the storage driver model being tested. A tester, such as a computing system manufacturer, often requests samples from the storage drive supplier. The testing schedule for the qualification test, including the lengths of time for each test phase, and the amount of samples needed is often difficult to ascertain, involving a certain amount of guesswork. In addition, the schedule and number of drives, being dependent on a number of factors, may change due to unforeseen circumstances.

The test plan generation apparatus 110 generates a test plan for a storage drive qualification test. The test plan includes a storage drive requirement. The storage drive requirement may be a recommended, estimated, and/or a predicted number of storage drives needed for the qualification test for one or more qualification test phases. The test plan also includes a testing schedule that may be a recommended, estimated, and/or predicted time period for the one or more qualification test phases. The test plan generation apparatus 110, in one embodiment, receives input values for a plurality of variables associated with factors that increase or decrease testing time and a number of storage drives for testing. These variables may be independent of specifications of a particular storage drive model and may be applicable to many different kinds of storage drives from various manufacturers. In one embodiment, the variables are uniform across storage drive models, storage drive manufacturers, and the like. The variables may be different from storage drive specifications. For example, a specification may be an interface type of a storage drive, while a particular variable may involve a numerical approximation on hardware commonality with other storage drives. The input values may be based on certain characteristics of the storage drive model being tested to customize the test plan. However, as stated above, the input values may be different from mere recitation of storage drive model specifications. In one embodiment, at least a portion of the variables are directed at approximating how familiar a tester is with the storage drive model being tested.

The test plan generation apparatus 110 may associate the variables with weights that are based on the impact of the variables on the testing time and the number of storage drives needed for testing. For example, an urgency factor variable (how much the qualification test should be expedited) may increase the number of storage drives needed for the test, as more storage drives may mean more tests can be performed simultaneously. The test plan generation apparatus 110 may adjust the input values, based on the weights of the corresponding variables. Certain variables may have more of an impact on the testing schedule or the number of storage drives for the test than others. For example, continuing with the previous example, in one embodiment, a higher input value for the urgency factor variable may have a greater effect on the storage drive requirement than a higher input value for another variable.

Based on the weighted input values, the test plan generation apparatus 110 may generate the test plan, including determining a testing schedule and a storage drive requirement. By generating a test plan based on these variables that commonly affect the qualification test, the test plan generation apparatus 110 may help to predict the testing schedule and storage drive requirement, eliminating guesswork, allowing for more accurate budgeting, higher testing quality, and more accurate sample requests from suppliers.

The test plan generation apparatus 110 may be part of a server 105 as depicted, accessible by a client 120a through a network 115 or may be installed on or accessible by a computing device, such as a desktop computer, workstation, laptop computer, tablet computer, a mobile computing device such as a cellular phone or smartphone, or any other computing device. The server 105 may be part of a cloud computing environment accessible by a client (e.g. 120a).

The server 105 may include a processor and a memory that stores computer readable programs. The memory may be embodied by volatile memory such as dynamic random access memory ("DRAM"), static random access memory ("SRAM"), or other suitable volatile memory. The processor executes the computer readable programs as is well known to those skilled in the art. The computer readable programs may be tangibly stored in storage in the server 105. The storage may include a Solid State Drive ("SSD"), a hard disk drive ("HDD"), an optical storage device, a holographic storage device, a micromechanical storage device, or other non-volatile data storage device. The server 105 may be embodied by a server computer, a desktop computer, a laptop computer, a tablet computer, a mobile device, or another computing device. The server 105 is in communication with one or more clients 120*a*, 120*b*, 120*c*, through a network 115.

The network 115 may comprise a communications network such as the Internet, a Local Area Network ("LAN"), a Wireless LAN ("WLAN"), multiple LANs communicating over the Internet, or any other similar communications network. Each client 120*a*, 120*b*, 120*c* communicates with the server 105 through the network 115. A client 120*a* may be embodied as a desktop computer, a portable computer, a server, a mainframe computer, a handheld computing device, a touch device, a PDA, a tablet computer, an e-book reader, a mobile phone, a Smartphone, and the like. In one embodiment, a client 120*a* may access the test plan generation apparatus 110 over the network such as, for example, through an application, using a web browser to access a webpage provided by the test plan generation apparatus 110, or the like.

Figure 2:
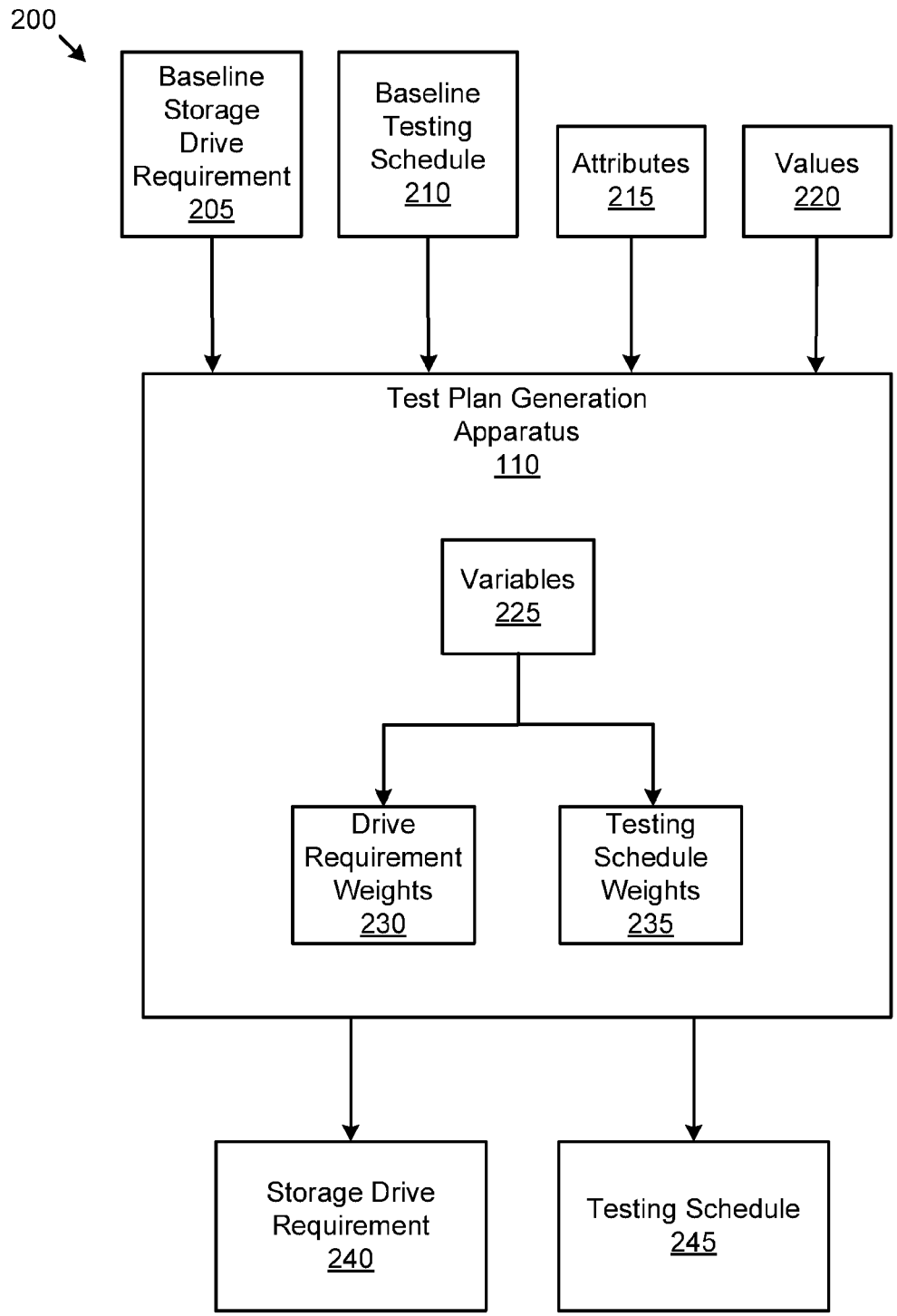
FIG. 2 is a schematic block diagram illustrating one embodiment of input and output for a qualification test planning apparatus in accordance with the present invention.

FIG. 2 is a schematic block diagram illustrating one embodiment of input and output for a test plan generation apparatus 110. FIG. 2 depicts the test plan generation apparatus 110 of FIG. 1 receiving, in one embodiment, a baseline storage drive requirement 205, a baseline testing schedule 210, a plurality of storage drive model attributes 215, and a plurality of input values 220.

The baseline storage drive requirement 205 may include an initial or preliminary value representing a number of storage drives for a qualification test. The baseline storage value may include an industry baseline storage drive requirement 205, an average storage drive requirement, a minimum storage drive requirement, a storage drive requirement established by a storage drive supplier, a default storage drive requirement 205, and/or the like. The baseline storage drive requirement 205 may serve as a starting point in determining the storage drive requirement 240 as described below. In one embodiment, the baseline storage drive requirement 205 specifies a number of storage drives for a plurality of qualification test phases as described below.

Similarly, the baseline testing schedule 210 may include an initial or preliminary value representing an estimated time requirement for the qualification test. The baseline storage value may include an industry baseline testing schedule 210, an average testing schedule, a minimum testing schedule, a testing schedule established by a storage drive supplier, a default testing schedule, and/or the like. The baseline testing schedule 210 may serve as a starting point in determining the testing schedule 245 as described below. In one embodiment, the baseline testing schedule 210 specifies a number of storage drives for a plurality of qualification test phases as described below.

The storage drive model attributes 215 may include attributes, specifications, and/or characteristics of the storage drive model being tested. These attributes may include, but are not limited to, a drive speed such as 7.2 k rpm, 10 k rpm, or the like, a drive size such as 3.5 inch, 2.5 inch, or the like, and a drive interface such as SCSI, SAS, SATA or the like. The attributes may also include a number of available capacity points, which refers to a number of drive capacities for the storage drive model as described below. The test plan generation apparatus 110 may use the storage drive model attributes 215 to customize the test plan as described below.

The input values 220 may specify certain characteristics of the storage drive model, or the qualification test, and/or the like as described below. The input values 220 correspond to a plurality of variables 225. As stated above, the plurality of variables 225 may be associated with factors that increase or decrease testing time and a number of storage drives for testing. The test plan generation apparatus 110 may associate each variable 225 with a drive requirement weight 230 and/or a testing schedule weight 235, which may determine an effect of the input values 220 on the test plan. The test plan generation apparatus 110 may apply the drive requirement weight 230 and/or the testing schedule weight 235 to the input values 220 to adjust the input values 220 (increasing or decreasing an effect of the input values 220). The test plan generation apparatus may adjust the baseline storage drive requirement 205 and the baseline testing schedule 210 according to the weighted input values 220, generating a testing plan that includes a storage drive requirement 240 and a testing schedule 245.

Figure 3:
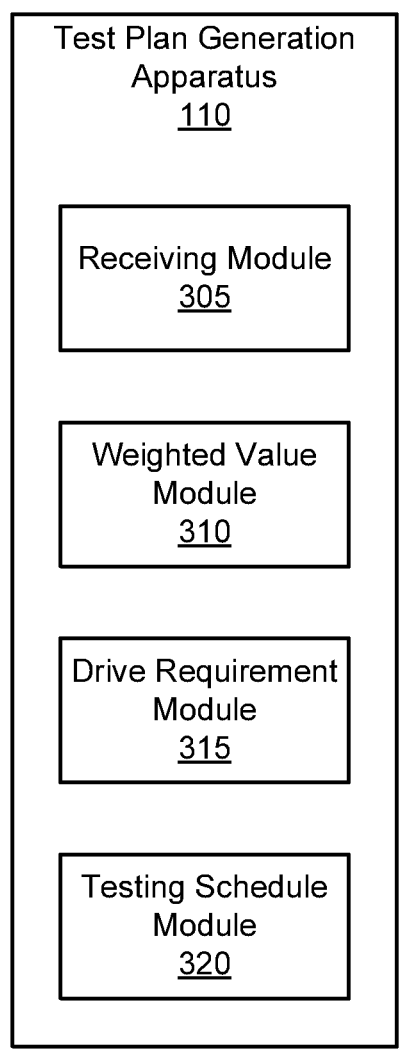
FIG. 3 is a schematic block diagram illustrating one embodiment of an apparatus for generating a storage drive qualification test plan in accordance with the present invention.

FIG. 3 is a schematic block diagram illustrating one embodiment of an apparatus 300 for generating a storage drive qualification test plan. The apparatus 300 includes the test plan generation apparatus 110 with a receiving module 305, a weighted value module 310, a drive requirement module 315, and a testing schedule module 320, which are described below.

The receiving module 305, in one embodiment, receives input values 220 for a plurality of variables 225 for a qualification test of a storage drive model. As stated above, the plurality of variables 225 may be associated with factors that increase or decrease testing time and a number of storage drives for testing. Each variable 225 may be associated with a drive requirement weight 230 and/or a testing schedule weight 235. The drive requirement weight 230 may correspond to the storage drive requirement 240 and the testing schedule weight 235 may correspond to the testing schedule 245. In one embodiment, the drive requirement weight 230 for a particular variable 225 is different than the testing schedule weight 235 for the particular variable 225 causing the particular variable 225 to have a different effect on the testing schedule 245 than on the storage drive requirement 240. The variables 225 may be independent of specifications of the storage drive model, of a manufacturer of the storage drive model, and the like.

The plurality of variables 225 may include, but are not limited to, an asynchronous or synchronous qualification variable, a part number variation variable, a hardware commonality factor variable, a firmware commonality factor variable, an urgency factor variable, a new external feature variable, a new internal technology variable, a previous generation derivative variable, a supplier experience factor variable, and a sample quantity variable.

The asynchronous or synchronous qualification variable may specify whether the computing system on which the storage drive model is being tested is under development. Specifically, a synchronous qualification is tied to a computing system being developed. An asynchronous qualification is typically independent of a computing system schedule. Testing of a synchronous computing system may take longer because computing system is still changing during the qualification test.

The part number variation variable may specify a number of capacity points of the storage drive model. As stated above, a particular storage drive model may multiple capacity points, or come in versions having different capacities. For example, on storage drive model may have three capacity points: a 20 GB version of the storage drive, a 40 GB version of the storage drive, and a 60 GB version of the storage drive. As the number of capacity points increases, the testing time may increase. The hardware commonality factor variable may specify how similar hardware (e.g. motors base casting, platters, or the like) of storage drives of the storage drive model is in comparison to other storage drives of the same model, other storage drive models, storage drive models previously tested by the tester, and/or the like.

The firmware commonality factor variable may specify how similar firmware (e.g. embedded software of the storage drive) of storage drives of the storage drive model is in comparison to other storage drives of the same model, other storage drive models, storage drive models previously tested by the tester, and/or the like. The urgency factor variable may specify how much the qualification test should be expedited. An increased urgency factor may increase the number of storage drives needed for the qualification test to reduce a time requirement for the qualification test, as more storage drives may mean more tests can be performed simultaneously.

The new external technology variable may specify whether the storage drive model includes new technology related to the form of the storage drive, such as a new interface speed, a new interface type, a new form factor, or the like. New external technology may include new industry-wide technology, such as an industry shift in drive size. The new internal technology variable may specify whether the storage drive model includes new technology related to the internal functionality of the storage drive such as a change in sector size, Hard Disk Drive (HDD) shingling, or the like. New internal technology may also include new industry-wide technology.

The previous generation derivative variable may specify whether the storage drive model is a derivative of a previous generation of storage drives. A subsequent generation of a storage drive model often shares similar characteristics with a storage drive model of a previous generation. As a result, the storage drives model of the subsequent generation may require less testing as the tester may have experience with the shared characteristics.

The supplier experience factor variable may specify how much experience the tester has with the supplier. A supplier with which the tester has little experience may indicate a need for more testing in relation to other better known suppliers. The sample quantity variable may specify a likelihood of a shortage of sample storage drives for the test. For example, a supplier may not be able to supply all desired samples at once.

Each variable 225 correspond to possible input values 220. Referring to FIG. 5A, which depicts a table 500 showing one embodiment of the variables 505, possible input values 510, and weights 515, the possible input values 510 may differ depending on the variable 505. For example, certain variables 505 may correspond to "yes" or "no" inputs, such as the new external features variable, while others, such as the part number variation variable, may correspond to a number on a numerical scale (e.g. a possible input may be a 1 on a scale of 1-5). Possible input values 510 may take other forms in various other embodiments.

Referring back to FIG. 3, the receiving module 305, in one embodiment, determines one or more sub-variables based on the input values 220 for the plurality of variables 225. Specifically, certain input values 220 may trigger a sub-variable. For example, if an input value 210 for the new external technology variable is "yes," meaning that the storage drive model includes new external technology, the receiving module 305 may determine a sub-variable specifying whether the new external technology is supplier specific.

A similar sub-variable may also apply to the new internal technology variable. The receiving module 305 may receive one or more input values 220 for the one or more sub-variables. For example, in one embodiment, the receiving module 305 presents a user with a variable 225 in the form of a question, the user enters an input value 210 and the receiving module 305 determines a sub-variable based on the input value. The receiving module 305 may then present the sub-variable in the form of a "follow-up" question and receive an input value for the sub-variable. Another example of a sub-variable may specify how many previous generations of storage drives exist in response to the input value 210 for the previous generation variable indicating that other previous generations exist. The sub-variables may be factored into the weight of the parent variables and the storage drive requirement and the testing schedule may be determined in part based on the input values for the one or more sub-variables as a result.

The weighted value module 310, in one embodiment, applies testing schedule weights 235 and drive requirement weights 230 to the input values 220 to adjust the effect each input value 210 may have on the test plan. The testing schedule weight 235 specifies an effect of the input values 220 on the testing schedule 245 and the drive requirement weight 230 specifies an effect of the input values 220 on the drive requirement. The testing schedule weight 235 and the drive requirement weight 230 may each include a weight range that specifies the range of possible effects the input values 220 have on the test plan. For example, referring also again to FIG. 5A, the weight range 515 for the asynchronous or synchronous qualification variable for the testing schedule weight is 0.4 (by subtracting 0.85 from 1.25). The weight ranges of the testing schedule weight 235 and the drive requirement weight 230 may include specific values 515 that correspond to possible input values 510 (as depicted in FIG. 5A), an equation as described below, or the like. The weighted value module 310 in certain embodiments, may provide default testing schedule weights 235 and drive requirement weights 230, may allow the tester to adjust and/or provide the testing schedule weights 235 and/or the drive requirement weights 230, and/or the like.

The larger the weight range for a specific variable 225 in relation to other weight ranges, the greater the effect an input value 210 for the specific variable 225 has on the test plan. The percentage of total weight for any variable 225 ("variable weight percentage") may be calculated by dividing the weight range for that variable 225 by the sum of the weight ranges. For example, the weight range for the part number variation variable for the testing schedule weight 235 may be 0.2. The sum of the weight ranges for the testing schedule weight in the example 235 is 29.5. Therefore, the variable weight percentage of the part number variation variable in the example is approximately 7%. FIG. 5C depicts one embodiment of a table 555 with approximate variable weight percentages 565, 570 for the drive requirement weights 565 and the testing schedule weights 570 for the variables 560. In other embodiments, other variable weight percentages may be used depending on the needs and/or experience of the tester, histories of completed qualification tests, and the like.

Referring again to FIG. 3, the input values 220 adjusted according to the weights, may be referred to as weighted drive requirement values and weighted testing schedule values respectively. Specifically, the weighted value module 310, in one embodiment, determines a plurality of weighted drive requirement values by adjusting each input value 210 having a corresponding drive requirement weight 230 by the corresponding drive requirement weight 230. Not every variable 225 may include a drive requirement weight 230 (e.g. not all variables 225 may apply to both the testing schedule 245 and the storage drive requirement 240); therefore, for those variables 225 that include a drive requirement weight 230, the weighted value module 310 may apply that drive requirement weight 230 to determine the weighted drive requirement values. Similarly, the weighted value module 310 may determine a plurality of weighted testing schedule values by adjusting each input value 210 having a corresponding testing schedule weight 235 by the corresponding testing schedule weight 235.

In one embodiment, each possible input value of a plurality of possible input values 220 for the variables 225 correspond to a particular weighted drive requirement value and/or a particular weighted testing schedule value. For example, referring again also to FIG. 5A, the drive requirement weight 515 for the asynchronous or synchronous qualification variable may include "1" for an input value 210 of "asynchronous" and "2" for an input value 210 of "synchronous." Similarly, the testing schedule weight 520 for the asynchronous or synchronous qualification variable may include "0.85" for an input value 210 of "asynchronous" and "1.25" for an input value 210 of synchronous. The weighted value module 310 may determine the weighted drive requirement values and the weighted testing schedule values by correlating each input value 210 with the corresponding weighted drive requirement value and/or the weighted testing schedule value. For example the weighted value module 310 may determine that the weighted drive requirement value for the new external technology variable, based on an input value 210 of "yes" is "2" by referencing the corresponding drive requirement weight 230.

In another embodiment, the drive requirement weight 230 and the testing schedule weight 235 include equations into which the input values 220 may be input. Therefore, the weighted value module may correlate an input value 210 and a drive requirement weight 230 or a testing schedule weight 235 by inputting an input value 210 into an equation to determine the weighted drive requirement value or the weighted testing schedule value. In one embodiment, these equations may be based on weights assigned for possible input values 220, such as the weights 515, 520 in FIG. 5A and may be determined by plotting the weights and calculating a best fit equation that most closely approximates a line between the plot points (e.g. a trend line).

For example, for the part number variation variable, with the drive requirement weights 230 of 1=1, 2=0.75, 3=0.6, 4=0.5, and 5=0.4, a best fit equation may equal $-0.36887873*LN(input\ value)+1$. Other equations for the drive requirement weights 230 may include $0.01*(input\ value)+0.5$ for the hardware commonality factor variable, $0.7+(input\ value)*0.006$ for the firmware commonality factor variable, $0.5*1.14869835^{(input\ value)}$ for the urgency factor variable, and $0.02*(input\ value)+1$ for the supplier experience factor variable. For the testing schedule weights 235, the equations may include $y=-0.0125*(input\ value)^2+0.1225*(input\ value)+0.895$ for the part number variation variable, $-0.00004*(input\ value)^2+0.008*(input\ value)+0.7$ for the hardware commonality factor variable, $-0.00002*(input\ value)^2+0.004*(input\ value)+0.85$ for the firmware commonality factor variable, $-0.008*(input\ value)^2+0.02*(input\ value)+1.1$ for the urgency factor variable, $0.01*(input\ value)+1$ for the supplier experience factor variable, and $0.001*(input\ value)^2-0.035*(input\ value)+1.2$ for the sample quantity variable. In the previous equations, the caret ("^") means that the number subsequent the caret is an exponent of the number before the caret.

The previous equations are based on the drive requirement weights 515 and the testing schedule weights 520 depicted in FIG. 5A. In other embodiments, other equations may be determined by plotting weight values corresponding to other weight ranges and determining other best fit equations. In one embodiment, the weighted value module 310 may also assign a weight for any sub-variables. The weighted value module 310 may average a sub-variable's weight with its parent variable's weight.

One embodiment of weighted drive requirement values 545 and the weighted testing schedule values 550 (collectively "weighted values") is depicted in the table 530 of FIG. 5B. These weighted values 545, 550 are based on the best fit equations for the weights in columns 515 and 520 of FIG. 5A when applied to the depicted input values 540. The depicted weights 515, 520 and weighted values 545, 550 treat a value of "1" as a neutral value, meaning that the closer a particular weighted value 545, 550 is to "1," the less effect a particular weight value 545, 550 may have on the storage drive requirement 240 or the testing schedule 245. A lower weighted value 545, 550 may reduce a number of drives in a storage drive requirement 240 or a number of days in a testing schedule 245 and a higher weighted value 545, 550 may have the opposite effect. In other embodiments, other forms of weighted values 545, 550 and weights 515, 520 may be used to adjust the input values 220 based on the weights 545, 550.

Referring back to FIG. 3, the drive requirement module 315, in one embodiment, determines a storage drive requirement 240 by adjusting the baseline storage drive requirement 205. Specifically, the drive requirement module 315 may increase or decrease the baseline storage drive requirement 205 according to the weighted drive requirement values. In one embodiment, the storage drive requirement 240 is divided into a plurality of qualification test phases and the drive requirement module 315 determines a number of storage drives for the plurality of qualification test phases. These qualification test phases may include, but are not limited to, an Early Life Performance ("ELP") test phase, a Sub System Design Verification ("SSDV") test phase, and a System Integration Testing ("SIT") test phase as described above.

In one embodiment, the drive requirement module 315 adjusts the baseline storage drive requirement 205 by averaging the plurality of weighted drive requirement values and multiplying the average of the plurality of weighted drive requirement values by the baseline storage drive requirement 205. For example, FIG. 5D depicts a table 575 with one embodiment of a baseline storage drive requirement 580 and a table 585 with one embodiment of a baseline testing schedule 586. Referring also to FIG. 5B, for the baseline storage drive requirement 580 depicted in the table of FIG. 5D, the drive requirement module 315 may add the weighted drive requirement values 545, which equals approximately 11.98, and divide by 9, the total number of weighted drive requirement values 545 to equal 1.33, the average of the weighted drive requirement values 545. In this embodiment, the sample quantity variable is not used for the storage drive requirement. The drive requirement module 315 may then multiply 1.33 by the baseline storage drive requirement 580 for each test phase to determine the storage drive requirement 240 for each test phase. Therefore, referring also to FIG. 5E, depicting a table 587 with one embodiment of the storage drive requirement 588, the ELP storage drive requirement would be 266 storage drives (1.33*200), the SSDV storage drive requirement would be 27 storage drives (1.33*20), and the SIT storage drive requirement would be 133 storage drives (1.33*100) for a total storage drive requirement of 426 storage drives.

Referring again to FIG. 3, the testing schedule module 320, in one embodiment, determines a testing schedule 245 by one of increasing and decreasing a baseline testing schedule 210 according to the weighted testing schedule values. In one embodiment, the testing schedule 245 is divided into a plurality of test phases and the testing schedule module 320 determines an estimated time requirement for the plurality of test phases. The test phases may include the test phases described above in relation to the drive requirement module 315. In one embodiment, the testing schedule module 320 determines the testing schedule 245 by averaging the plurality of weighted testing schedule values and multiplying the average of the plurality of weighted testing schedule values by the baseline testing schedule 210.

For example, referring also to FIGS. 5B and 5D, for the baseline testing schedule 586 depicted in the table 585 of FIG. 5D, the testing schedule module 320 may add the weighted testing schedule values 550, which equal approximately 10.9, and divide by 10, the total number of weighted testing schedule values 550, to equal 1.09, the average of the weighted testing schedule values 550. The drive requirement module 315 may then multiply 1.09 by the baseline testing schedule 586 for each test phase to determine the testing schedule 245 for each test phase. Therefore, referring also to FIG. 5E, depicting a table 590 with the testing plan schedule 595, the ELP testing schedule would be 266 days (1.33*200), the SSDV testing schedule would be 27 days (1.33*20), and the SIT testing schedule would be 133 days (1.33*100) for a total number of days of 146. SSDV may begin halfway through RDT, ELP may begin after RDT, and SIT may begin after SIT, therefore, the total number of days may be determined by dividing the RDT days in half and adding the SSDV days and the SIT days (33+61+61) to equal 155. As stated above, the RDT testing schedule may be set by the supplier.

Figure 4:
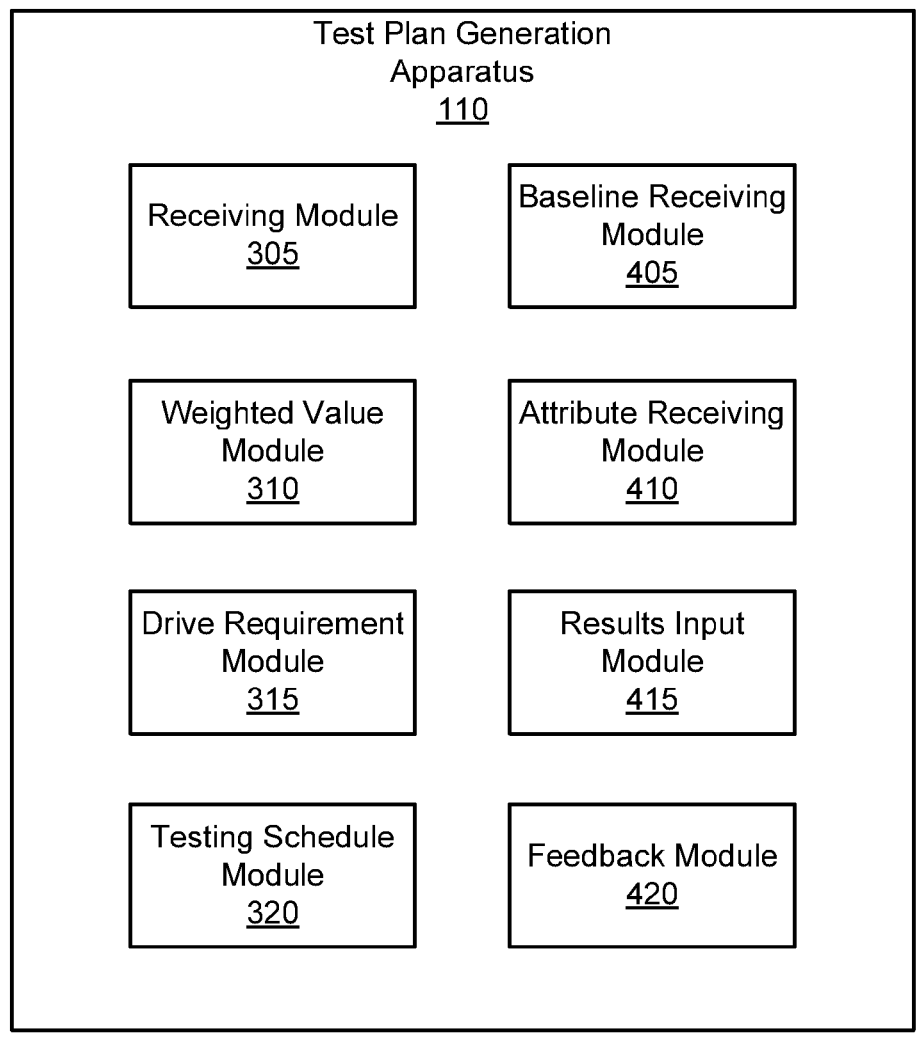
FIG. 4 is a schematic block diagram illustrating another embodiment of an apparatus for generating a storage drive qualification test plan in accordance with the present invention.

FIG. 4 is a schematic block diagram illustrating another embodiment of an apparatus 400 for generating a storage drive qualification test plan. The apparatus 400 includes an embodiment of the test plan generation apparatus 110 with a receiving module 305, a weighted value module 310, a drive requirement module 315, and a testing schedule module 320, which are substantially similar to those described in relation to the apparatus 300 of FIG. 3. In addition, the embodiment of the test plan generation apparatus 110 may include one or more of a baseline receiving module 405, an attribute receiving module 410, a results input module 415, and a feedback module 420, which are described below.

The baseline receiving module 405, in one embodiment, receives a baseline storage drive requirement 205 and a baseline testing schedule 210. The baseline receiving module 405 may receive the baseline storage drive requirement 205 and a baseline testing schedule 210 from a user or an application. The baseline receiving module 405 may prompt a user to enter the baseline storage drive requirement 205 and the baseline testing schedule 210 and the user may enter them as text input, by uploading a file, or other suitable input process.

The attribute receiving module 410, in one embodiment, receives a plurality of storage drive model attributes 215 of the storage drive model for the qualification test. The attribute receiving module 410 may prompt a user to enter the storage drive model attributes 215 and the user may enter them with text input, by uploading a file, or other suitable input process.

The results input module 415, in one embodiment, allows test results from completed qualification tests to be entered and stored for reference by the feedback module 420 described below. For a completed qualification test, the results input module 415 may receive an actual storage drive requirement that includes an actual number of storage drives tested during the completed qualification test. The results input module 415 may also receive an actual testing schedule that includes an actual testing time of a completed qualification test. In one embodiment, the results input module 415 prompts a user to enter actual results (e.g. a number of storage drives used and/or a number of testing days) at the end of each qualification testing phase (ELP, SSDV and SIT). The results input module 415 may store completed qualification tests along with a record of the storage drive model attributes 215 associated with those completed qualification tests.

The feedback module 420, in one embodiment, used historical testing data from completed qualification tests to adjust the drive requirement weight 230 and/or the testing schedule weight 235 for the qualification test. Specifically, the feedback module 420 may determine that one or more of the storage drive model attributes 215 match one or more storage drive model attributes 215 from a completed qualification test. The feedback module 420 may adjust one or more drive requirement weights 230 and one or more testing schedule weights 235 based on the actual storage drive requirement and the actual testing schedule of the completed qualification test.

The feedback module 420 may search stored completed qualification tests and locate one or more completed qualification tests that share common storage drive model attributes 215. If certain storage drive model attributes 215 are associated with particular trends in actual storage drive requirements or actual testing schedules, the feedback module 420 may adjust one or more weights based on those trends. In one embodiment, the feedback module 420 adjusts the baseline storage drive requirement 205 and/or the baseline testing schedule 210 based on an actual storage requirement and an actual number of storage drives from a completed qualification test. For example, if qualification tests for storage drives from a certain supplier consistently take longer than anticipated (e.g. longer an estimated testing schedule) of longer than qualification tests for storage drives from other suppliers, the feedback module 420 may increase the baseline testing schedule 210 for use by the apparatus.

Figure 6:
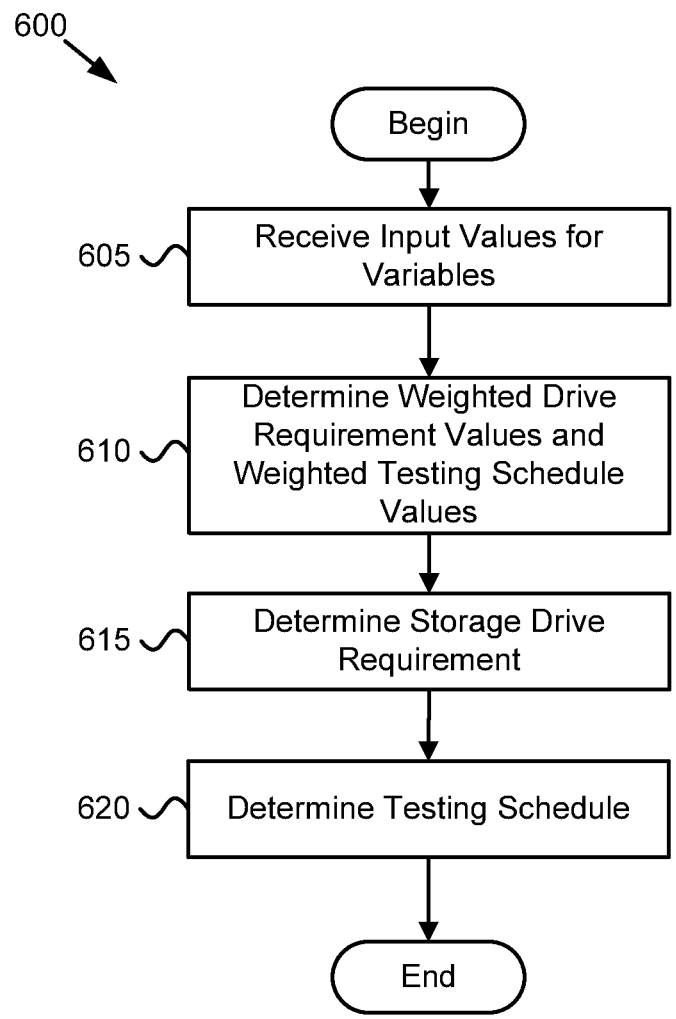
FIG. 6 is a schematic flow chart diagram illustrating one embodiment of a method for generating a storage drive qualification test plan in accordance with the present invention.

FIG. 6 is a schematic flow chart diagram illustrating one embodiment of a method 600 for generating a storage drive qualification test plan. The method 600 begins and the receiving module 305 receives 605 input values 220 for a plurality of variables 225 for a qualification test of a storage drive model. The plurality of variables 225 may be associated with factors that increase or decrease testing time and a number of storage drives for testing. Each variable 225 may have a drive requirement weight 230 and/or a testing schedule weight 235. The variables 225 may be independent of specifications of the storage drive model.

The weighted value module 310 determines 610 weighted drive requirement values and weighted testing schedule values. Specifically, the weighted value module 310 determines a plurality of weighted drive requirement values by adjusting each input value 210 having a corresponding drive requirement weight 230 by the corresponding drive requirement weight 230. The weight value module determines a plurality of weighted testing schedule values by adjusting each input value 210 having a corresponding testing schedule weight 235 by the corresponding testing schedule weight 235.

The drive requirement module 315 determines 615 a storage drive requirement 240 by either increasing or decreasing a baseline storage drive requirement 205 according to the weighted drive requirement values. The storage drive requirement 240 specifies a number of storage drives for testing during the qualification test. The testing schedule module 320 determines 620 a testing schedule 245 by either increasing or decreasing a baseline testing schedule 210 according to the weighted testing schedule values. The testing schedule 245 includes an estimated time requirement for the qualification test. Then the method 600 ends.

Figure 7:
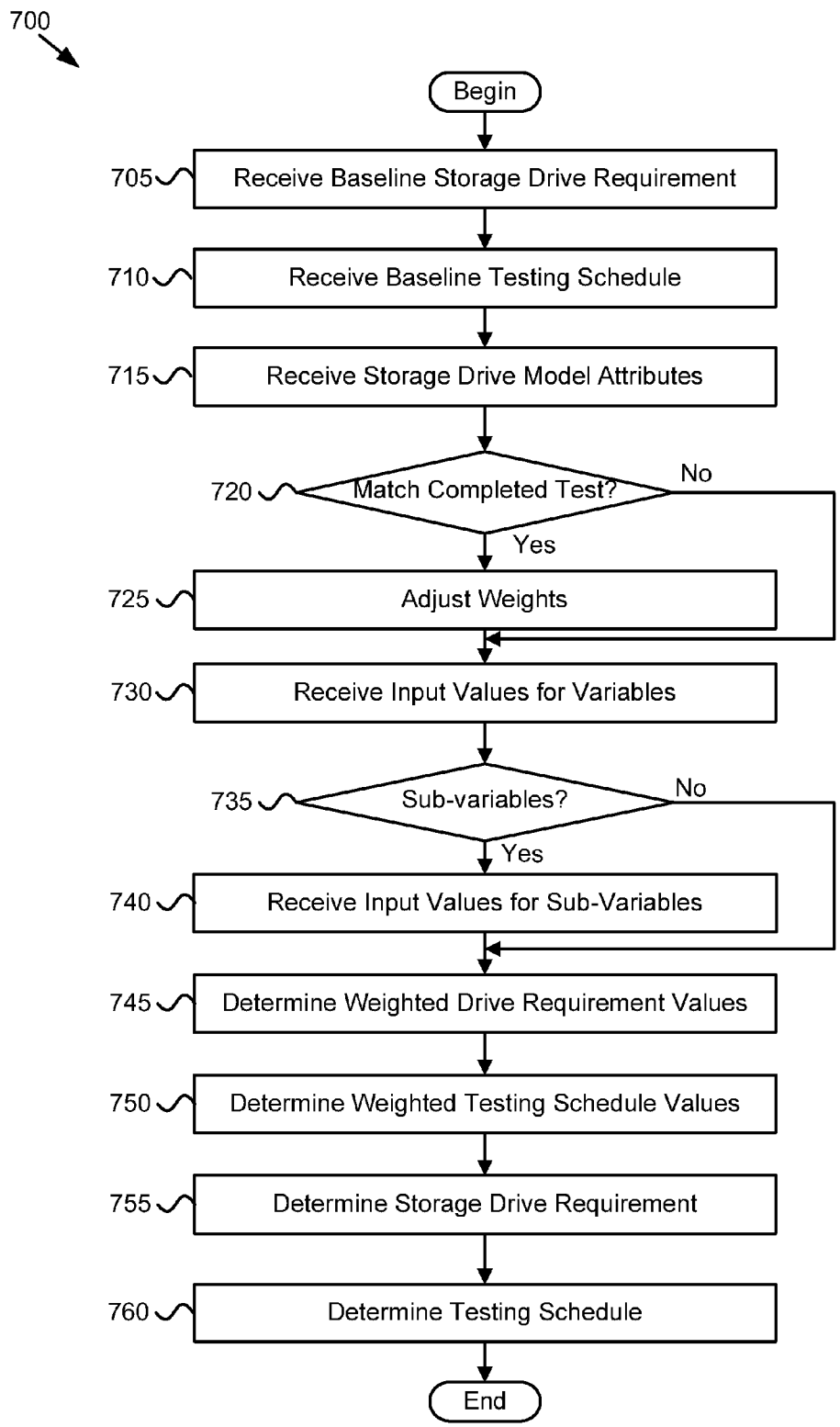
FIG. 7 is a schematic flow chart diagram illustrating another embodiment of a method for generating a storage drive qualification test plan in accordance with the present invention.

FIG. 7 is a schematic flow chart diagram illustrating another embodiment of a method 700 for generating a storage drive qualification test plan. The method 700 begins and the baseline receiving module 405 receives 705 a baseline storage drive requirement 205. The baseline receiving module 405 receives 710 a baseline testing schedule 210. The attribute receiving module 410 receives 715 a plurality of storage drive model attributes 215 of the storage drive model for the qualification test such as a drive speed, a drive size, a number of capacity points, and/or a drive interface.

If the feedback module 420 determines 720 that one or more of the storage drive model attributes 215 match one or more storage drive model attributes 215 from a completed qualification test, the feedback module 420 adjusts 725 one or more drive requirement weights 230 and/or one or more testing schedule weights 235 based on an actual storage drive requirement and an actual testing schedule of the completed qualification test. The feedback module 420 may also adjust the baseline storage drive requirement 205 and the baseline testing schedule 210 and the method 700 continues to step 730. Alternatively, if the feedback module 420 determines 720 that the one or more of the storage drive model attributes 215 fail to match one or more storage drive model attributes 215 from the completed qualification test, the method 700 proceeds to step 730.

The receiving module 305 receives 730 input values 220 for a plurality of variables 225 associated with factors that increase or decrease testing time and a number of storage drives for testing. If the receiving module 305 determines 735 that one or more sub-variables correspond with input values 220 to the one or more variables 225, the receiving module 305 receives 740 input values 220 for the sub-variables and the method 700 continues with step 745. Alternatively, the method 700 proceeds to step 745.

The weighted value module 310 determines 745 a plurality of weighted drive requirement values by adjusting each input value 210 having a corresponding drive requirement weight 230 by the corresponding drive requirement weight 230. The weighted value module 310 determines 750 a plurality of weighted testing schedule values by adjusting each input value 210 having a corresponding testing schedule weight 235 by the corresponding testing schedule weight 235.

The drive requirement module 315 determines 755 a storage drive requirement 240 by either increasing or decreasing a baseline storage drive requirement 205 according to the weighted drive requirement values. The storage drive requirement 240 specifies a number of storage drives for testing during the qualification test. The testing schedule module 320 determines 760 a testing schedule 245 by either increasing or decreasing a baseline testing schedule 210 according to the weighted testing schedule values. The testing schedule includes an estimated time requirement for the qualification test. Then, the method 700 ends.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus executing on one or more processors, the apparatus executing the steps of:
    receiving input values for a plurality of variables for a qualification test of a storage drive model, the plurality of variables associated with factors that increase or decrease testing time and a number of storage drives for testing, each variable having one or more of a drive requirement weight and a testing schedule weight, the variables independent of specifications of the storage drive model;
    determining a plurality of weighted drive requirement values by adjusting each input value having a corresponding drive requirement weight by the corresponding drive requirement weight and determining a plurality of weighted testing schedule values by adjusting each input value having a corresponding testing schedule weight by the corresponding testing schedule weight;
    determining a storage drive requirement by one of increasing and decreasing a baseline storage drive requirement according to the weighted drive requirement values, the storage drive requirement specifying a number of storage drives for testing during the qualification test;
    determining a testing schedule by one of increasing and decreasing a baseline testing schedule according to the weighted testing schedule values, the testing schedule comprising an estimated time requirement for the qualification test; and
    executing the qualification test on the determined number of storage drives based on the testing schedule.

2. The apparatus of claim 1, wherein the baseline storage drive requirement comprises one of an industry baseline storage drive requirement, an average storage drive requirement, and a minimum storage drive requirement and wherein the baseline testing schedule comprises one of an industry baseline testing schedule, an average testing schedule, and a minimum testing schedule.

3. The apparatus of claim 2, further comprising executing the step of adjusting the baseline storage drive requirement and the baseline testing schedule based on an actual storage requirement and an actual number of storage drives from a completed qualification test, the actual storage drive requirement comprising an actual number of storage drives tested during the completed qualification test, the actual testing schedule comprising an actual testing time of the completed qualification test.

4. The apparatus of claim 1, further comprising executing the steps of:
  receiving a plurality of storage drive model attributes of the storage drive model for the qualification test, the storage drive model attributes comprising one or more of a drive speed, a drive size, a number of available capacity points, and a drive interface;
  determining that one or more of the storage drive model attributes match one or more storage drive model attributes from a completed qualification test; and
  adjusting one or more drive requirement weights and one or more testing schedule weights based on an actual storage drive requirement and an actual testing schedule of the completed qualification test in response to determining that one or more of the storage drive model attributes match one or more storage drive model attributes from the completed qualification test, the actual storage drive requirement comprising an actual number of storage drives tested during the completed qualification test, the actual testing schedule comprising an actual testing time of the completed qualification test.

5. The apparatus of claim 1, wherein determining the storage drive requirement further comprises determining a number of storage drives for a plurality of qualification test phases and wherein determining the testing schedule further comprises determining an estimated time requirement for a plurality of test phases.

6. The apparatus of claim 5, wherein the plurality of qualification test phases comprises an Early Life Performance (ELP) test phase, a Sub System Design Verification (SSDV) test phase, and a System Integration Testing (SIT) test phase.

7. The apparatus of claim 1, wherein the plurality of variables are selected from the group consisting of:
  an asynchronous or synchronous qualification variable;
  a part number variation variable;
  a hardware commonality factor variable;
  a firmware commonality factor variable;
  an urgency factor variable;
  a new external feature variable;
  a new internal technology variable;
  a previous generation derivative variable;
  a supplier experience factor variable; and
  a sample quantity variable.

8. The apparatus of claim 1, further comprising executing the steps of determining one or more sub-variables based on the input values for the plurality of variables and receiving one or more input values for the one or more sub-variables, wherein the storage drive requirement and the testing schedule are determined in part based on the input values for the one or more sub-variables.

9. The apparatus of claim 1, wherein each possible input value of a plurality of possible input values correspond to one or more of a weighted drive requirement value and a weighted testing schedule value and wherein determining the plurality of weighted drive requirement values and determining the plurality of weighted testing schedule values further comprises correlating each input value with one or more of a corresponding weighted drive requirement value and a weighted testing schedule value.

10. The apparatus of claim 1, wherein determining the storage drive requirement further comprises executing the steps of averaging the plurality of weighted drive requirement values and multiplying the average of the plurality of weighted drive requirement values by the baseline storage requirement.

11. The apparatus of claim 1, wherein determining the testing schedule further comprises averaging the plurality of weighted testing schedule values and multiplying the average of the plurality of weighted testing schedule values by the baseline testing schedule.

12. The apparatus of claim 1, wherein the drive requirement weight for a particular variable is different than the testing schedule weight for the particular variable.

13. An apparatus comprising:
  a receiving module that receives input values for a plurality of variables for a qualification test of a storage drive model, the plurality of variables associated with factors that increase or decrease testing time and a number of storage drives for testing, each variable having one or more of a drive requirement weight and a testing schedule weight, the variables independent of specifications of the storage drive model;
  a weighted value module that determines a plurality of weighted drive requirement values by adjusting each input value having a corresponding drive requirement weight by the corresponding drive requirement weight, the weight value module determining a plurality of weighted testing schedule values by adjusting each input value having a corresponding testing schedule weight by the corresponding testing schedule weight;
  a drive requirement module that determines a storage drive requirement by one of increasing and decreasing a baseline storage drive requirement according to the weighted drive requirement values, the storage drive requirement specifying a number of storage drives for testing during the qualification test;
  a testing schedule module that determines a testing schedule by one of increasing and decreasing a baseline testing schedule according to the weighted testing schedule values, the testing schedule comprising an estimated time requirement for the qualification test; and
  a test module that executes the qualification test on the determined number of storage drives based on the testing schedule,
  wherein said modules comprise one or more of logic hardware, a programmable hardware device, and executable code stored on non-transitory computer readable storage media, when said modules comprise executable code, the apparatus further comprises a processor that executes the executable code.

14. The apparatus of claim 13, further comprising a server executing the receiving module, the weighted value module, the drive requirement module, and the testing schedule module, the server comprising a processor and a memory.

15. The apparatus of claim 13, further comprising an attribute receiving module that receives a plurality of storage drive model attributes of the storage drive model for the qualification test, the storage drive model attributes comprising one or more of a drive speed, a drive size, a number of capacity points, and a drive interface.

16. The apparatus of claim 15, further comprising a feedback module that:
  determines that one or more of the storage drive model attributes match one or more storage drive model attributes from a completed qualification test; and
  adjusts one or more drive requirement weights and one or more testing schedule weights based on an actual storage drive requirement and an actual testing schedule of the completed qualification test in response to determining that one or more of the storage drive model attributes match one or more storage drive model attributes from the completed qualification test, the actual storage drive requirement comprising an actual number of storage drives tested during the completed qualification test, the actual testing schedule comprising an actual testing time of the completed qualification test.

17. A computer program product comprising a non-transitory computer readable storage medium having computer readable program code embodied therewith for execution on one or more processors, the computer readable program code for:

receiving input values for a plurality of variables for a qualification test of a storage drive model, the plurality of variables associated with factors that increase or decrease testing time and a number of storage drives for testing, each variable having one or more of a drive requirement weight and a testing schedule weight, the variables independent of specifications of the storage drive model;

determining a plurality of weighted drive requirement values by adjusting each input value having a corresponding drive requirement weight by the corresponding drive requirement weight and determining a plurality of weighted testing schedule values by adjusting each input value having a corresponding testing schedule weight by the corresponding testing schedule weight;

determining a storage drive requirement by one of increasing and decreasing a baseline storage drive requirement according to the weighted drive requirement values, the storage drive requirement specifying a number of storage drives for testing during the qualification test;

determining a testing schedule by one of increasing and decreasing a baseline testing schedule according to the weighted testing schedule values, the testing schedule comprising an estimated time requirement for the qualification test; and executing the qualification test on the determined number of storage drives based on the testing schedule.

18. The computer program product of claim 17, wherein the plurality of variables are selected from the group consisting of:

an asynchronous or synchronous qualification variable;
a scenario number variable;
a hardware commonality factor variable;
a firmware commonality factor variable;
an urgency factor variable;
a new external feature variable;
a new internal technology variable;
a previous generation derivative variable;
a supplier experience factor variable; and
a sample quantity variable.

19. The computer program product of claim 17, wherein determining the storage drive requirement further comprises determining a number of storage drives for a plurality of qualification test phases and wherein determining the testing schedule further comprises determining an estimated time requirement for a plurality of test phases.

20. The computer program product of claim 19, wherein the plurality of qualification test phases comprises an Early Life Performance (ELP) test phase, a Sub System Design Verification (SSDV) test phase, and a System Integration Testing (SIT) test phase.

* * * * *